(12) United States Patent
Sun et al.

(10) Patent No.: US 12,056,949 B1
(45) Date of Patent: Aug. 6, 2024

(54) FRAME-BASED BODY PART DETECTION IN VIDEO CLIPS

(71) Applicant: Amazon Technologies, Inc., Seattle, WA (US)

(72) Inventors: Xiaohang Sun, Seattle, WA (US); Mohamed Kamal Omar, Seattle, WA (US); Alexander Ratnikov, Redmond, WA (US); Ahmed Aly Saad Ahmed, Bothell, WA (US); Tai-Ching Li, Issaquah, WA (US); Travis Silvers, Lynnwood, WA (US); Hanxiao Deng, Bellevue, WA (US); Muhammad Raffay Hamid, Seattle, WA (US); Ivan Ryndin, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 17/215,816

(22) Filed: Mar. 29, 2021

(51) Int. Cl.
*G06V 40/10* (2022.01)
*G06F 18/21* (2023.01)
*G06N 3/08* (2023.01)
*G06V 20/40* (2022.01)

(52) U.S. Cl.
CPC .......... *G06V 40/10* (2022.01); *G06F 18/2178* (2023.01); *G06N 3/08* (2013.01); *G06V 20/46* (2022.01)

(58) Field of Classification Search
CPC .... G06V 40/10; G06V 20/46; G06F 18/2178; G06N 3/08
See application file for complete search history.

(56) References Cited

U.S. PATENT DOCUMENTS

| | | |
|---|---|---|
| 6,553,566 B1 | 4/2003 | Grant et al. |
| 6,684,240 B1 | 1/2004 | Goddard |
| 6,850,252 B1 | 2/2005 | Hoffberg |

(Continued)

FOREIGN PATENT DOCUMENTS

CN 101341718 1/2009

OTHER PUBLICATIONS

Tan et al., "EfficientNet: Rethinking Model Scaling for Convolutional Neural Networks," Proceedings of the 36th International Conference on Machine Learning, May 28, 2019, 11 pages (Year: 2019).*

(Continued)

*Primary Examiner* — John W Lee
(74) *Attorney, Agent, or Firm* — Kilpatrick Townsend & Stockton LLP

(57) ABSTRACT

Techniques are disclosed for detecting an uncovered portion of a body of a person in a frame of video content. In an example, a first machine learning model of a computing system may output a first score for the frame based on a map that identifies a region of the frame associated with an uncovered body part type. Depending on a value of the first score, a second machine learning model that includes a neural network architecture may further analyze the frame to output a second score. The first score and second score may be merged to produce a third score for the frame. A plurality of scores may be determined, respectively, for frames of the video content, and a maximum score may be selected. The video content may be selected for presentation on a display for further evaluation based on the maximum score.

19 Claims, 11 Drawing Sheets

(56) References Cited

U.S. PATENT DOCUMENTS

| | | |
|---|---|---|
| 8,112,784 B1 | 2/2012 | Jackson et al. |
| 8,346,953 B1 | 1/2013 | Hew et al. |
| 8,843,953 B1 | 9/2014 | Dang et al. |
| 9,363,561 B1 | 6/2016 | Harmon et al. |
| 9,563,845 B1 | 2/2017 | Porter et al. |
| 9,980,004 B1 | 5/2018 | Ericson |
| 10,088,983 B1 | 10/2018 | Qaddoura et al. |
| 11,589,116 B1 | 2/2023 | Omar et al. |
| 2002/0147782 A1 | 10/2002 | Dimitrova et al. |
| 2004/0003393 A1 | 1/2004 | Gutta et al. |
| 2004/0006767 A1 | 1/2004 | Robson et al. |
| 2005/0052578 A1 | 3/2005 | Phillips et al. |
| 2006/0018524 A1* | 1/2006 | Suzuki .............. G06F 18/254 382/128 |
| 2007/0053513 A1 | 3/2007 | Hoffberg |
| 2009/0288112 A1 | 11/2009 | Kandekar et al. |
| 2011/0283311 A1 | 11/2011 | Luong |
| 2012/0311625 A1 | 12/2012 | Nandi |
| 2013/0185765 A1 | 7/2013 | Hew et al. |
| 2015/0003811 A1 | 1/2015 | Kandekar et al. |
| 2015/0070516 A1 | 3/2015 | Shoemake et al. |
| 2015/0334442 A1 | 11/2015 | Charania et al. |
| 2016/0323643 A1 | 11/2016 | Panchaksharaiah et al. |
| 2017/0272818 A1 | 9/2017 | Gattis et al. |
| 2017/0289624 A1 | 10/2017 | Avila et al. |
| 2018/0332347 A1 | 11/2018 | Hamiti et al. |
| 2018/0376205 A1 | 12/2018 | Oswal et al. |
| 2019/0122082 A1 | 4/2019 | Cuban et al. |
| 2019/0373322 A1 | 12/2019 | Rojas-Echenique et al. |
| 2019/0378034 A1* | 12/2019 | Mowrer ............. H04N 21/6582 |
| 2020/0162489 A1* | 5/2020 | Bar-Nahum ........... G06N 20/00 |
| 2022/0207288 A1* | 6/2022 | Zlotnick .............. G06F 18/254 |

OTHER PUBLICATIONS

Zhou et al., "Learning Deep Featuers for Discriminative Localization," IEEE, Dec. 14, 2015, pp. 2921-2929 (Year: 2015).*

Sundararajan et al., "Axiomatic Attributions for Deep Networks," Proceedings of the 34th International Conference on Machine Learning, vol. 70, Aug. 2017, 11 pages.

Tan et al., "EfficientNet: Rethinking Model Scaling for Convolutional Neural Networks," Proceedings of the 36th International Conference on Machine Learning, Jun. 7, 2019, 11 pages.

Wang et al., "Self-supervised Equivalent Attention Mechanism for Weakly Supervised Semantic Segmentation," IEEE/CVF Conference on Computer Vision and Pattern Recognition (CVPR), 2020, pp. 12275-12284.

Zhou et al., Learning Deep Features for Discriminative Localization, EEE Conference on Computer Vision and Pattern Recognition (CVPR), Dec. 14, 2015, 10 pages.

Carreira et al., "Quo Vadis, Action Recognition? A New Model and the Kinetics Dataset", Conference on Computer Vision and Pattern Recognition, Jul. 2017, pp. 6299-6308.

Kay et al., "The Kinetics Human Action Video Dataset", Availabe Online at: https://arxiv.org/pdf/1705.06950.pdf, May 2017, 22 pages.

Wang et al., "Non-Local Neural Networks", IEEE Conference on Computer Vision and Pattern Recognition, Jun. 2018, 10 pages.

* cited by examiner

```
                                                    ← 900
```

RECEIVE VIDEO CONTENT INCLUDING A FIRST FRAME, THE FIRST FRAME SHOWING AN UNCOVERED PORTION OF A BODY OF A PERSON, THE UNCOVERED PORTION BEING ONE OF A PLURALITY OF BODY PART TYPES 902

↓

RECEIVE, BY A MACHINE LEARNING MODEL, THE FIRST FRAME OF VIDEO CONTENT, THE MACHINE LEARNING MODEL TRAINED BASED AT LEAST IN PART ON A LOSS FUNCTION THAT PENALIZES THE MACHINE LEARNING MODEL FOR INCORRECTLY IDENTIFYING THAT A REGION OF A MAP ASSOCIATED WITH THE FIRST FRAME IS ASSOCIATED WITH ONE OF THE PLURALITY OF UNCOVERED BODY PART TYPES 904

↓

DETERMINE, BY THE MACHINE LEARNING MODEL, A SCORE INDICATING A LIKELIHOOD THAT THE FIRST FRAME SHOWS AT LEAST ONE OF THE PLURALITY OF UNCOVERED BODY PART TYPES 906

↓

DETERMINE THAT A PORTION OF THE VIDEO CONTENT THAT INCLUDES THE FIRST FRAME WILL BE PRESENTED ON A DISPLAY BASED ON THE SCORE 908

FIG. 9

FRAME-BASED BODY PART DETECTION IN VIDEO CLIPS

BACKGROUND

Multimedia distribution services exist that service different markets (e.g., target customers and/or geographic regions). For example, a distribution service may distribute video content in Japan, India, and the United States (U.S.), among other regions. Each region may have different rules and/or standards that apply, with respect to what types of video content may be shown in a particular region. For example, the U.S. may allow video content to be published (e.g., for a general audience) that shows a bare buttock, while India may not allow such video content to be shown. In recent times, with a dramatic increase in the amount of video content being submitted by content producers for publishing online, it may be challenging for the distribution service to adequately perform a compliance review on each submitted video content. This becomes especially challenging when the distribution service must take into account the different compliance rules per region.

BRIEF DESCRIPTION OF THE DRAWINGS

Various embodiments in accordance with the present disclosure will be described with reference to the drawings, in which:

FIG. 9 is a flow diagram illustrating a method for presenting a video clip segment based on determining a likelihood that the video clip segment shows an uncovered portion of a body of a person, in accordance with various embodiments;

DETAILED DESCRIPTION

Figure 1:
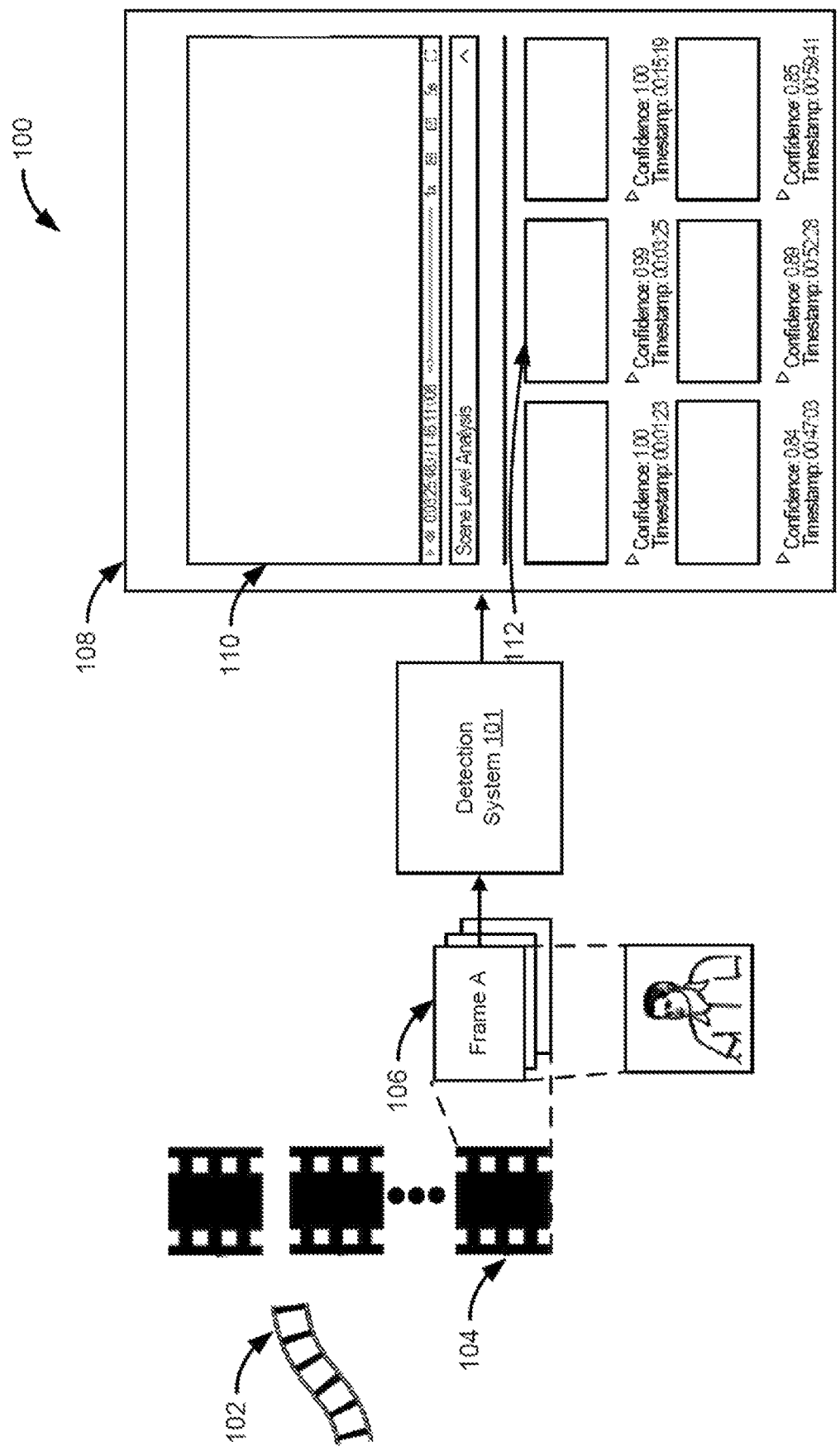
FIG. 1 is a schematic diagram illustrating an example detection system for determining if a video content shows an uncovered portion of a body of a person, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques for detecting an uncovered portion of a body of a person in a frame of video content. Consider an example in which a computer system receives a video clip (e.g., of a movie title) that includes a sequence of frames. A first frame of the sequence of frames may be received by a first machine learning (ML) model of the computer system. The first ML model, which may be trained to maximize a recall statistic, may analyze the first frame and output a first score that indicates a likelihood that the first frame shows at least one uncovered body part type (e.g., bare buttocks, a bare breast, and/or a male or female genitalia). Depending on the value of the first score (e.g., compared to one or more threshold values), a second ML model of the computer system may subsequently receive and analyze the first frame. The second ML model may be trained to maximize a precision statistic. In this example, the second ML model generates a second score for the first frame. The computer system then merges the first score and the second score to produce a third score for the first frame. The third score indicates that the first frame likely shows at least one uncovered body part type. The computer system then determines to present a portion of the video clip that includes the first frame (e.g., a video clip segment of the video clip) on a display. The display may enable further evaluation of the video clip segment by an agent (e.g., a human operator), for example, to confirm if nudity is shown in the video clip segment portion of the video clip. In this way, techniques may provide a resource-efficient method for detecting uncovered body parts within a video clip, while maintaining both high recall and precision. Also, among other applications, these techniques may provide for more efficient subsequent evaluation of video content (e.g., a lengthy movie) by an agent, for example, by presenting portions of the video content that are more likely to contain nudity.

To further illustrate, consider an example in which a multimedia distribution service receives and/or maintains a collection of video contents (e.g., including movie titles, television (TV) shows, video recordings from user devices that are uploaded to the distribution service, etc.). The multimedia distribution service selects a particular video title (e.g., a particular movie title) for distribution to one or more regions. Each region has different applicable rules that govern what types of content may (or may not) be shown in that region. In this example, suppose that India is one of the target regions and that India restricts distribution of content that shows any one of a plurality of uncovered body part types (e.g., associated with nudity), for example, including bare buttocks, bare female breasts, bare female genitalia, and/or bare male genitalia.

In this example, a computer system of the multimedia distribution service may receive video content (e.g., a video clip) that corresponds to at least a portion (e.g., all, or a subset) of the particular video title. The video content that is received by the computer system may include a sequence of frames. Meanwhile, the computer system may include two ML models, a first ML model and a second ML model. Each model may be suitable for analyzing a particular frame. As described further herein, the first ML model may be selected and/or trained to be optimized for providing a higher recall. Meanwhile, the second ML model may be selected and/or trained to be optimized for providing a higher precision. In some cases, only the first ML model may be executed, for example, if the computer system has acceptable confidence in the accuracy of a first score that is output by the first ML model. For example, in a case where the first score output by the first ML model is greater than a first threshold value or lower than a second threshold value, the first score may be determined to be the final score for a frame. In some embodiments, only the first ML model (e.g., and not the second ML model) may be invoked, at least in part to optimize on computing resource utilization.

In some embodiments, the second ML model may be conditionally invoked (e.g., to produce a second score for a frame) based on whether a first score (for the same frame) output by the first ML model is greater than a particular threshold (e.g., or any other suitable conditional mechanism, described herein). For example, the second model may be invoked in difficult cases where the first model is known to produce common error patterns (e.g., having lower precision). In some embodiments, both models may run in parallel. In cases where both models are executed, the first score and the second score may be merged to produce a third score (e.g., a final score) for the frame.

Continuing with the illustration above, and, discussing both models in further detail, the first ML model of the computer system may receive a first frame of the sequence of frames. In some embodiments, the first ML model may include a weakly supervised segmentation (WSS) model that is trained based on one or more maps, for example, class activation maps (CAMs). The first ML model may be trained based in part on a loss function that penalizes the first ML model for incorrectly identifying that a region (e.g., one or more locations) of a CAM is associated with one of the plurality of uncovered body part types. Accordingly, the first ML model may not only provide predictions (e.g., of nudity) for the entire first frame, but may also identify specific regions within the first frame that contain nudity. For more information about at least some details regarding the first ML model, see Wang, Yude, et. al., "Self-supervised Equivariant Attention Mechanism for Weakly Supervised Semantic Segmentation," *Proceedings of the IEEE/CVF Conference on Computer Vision and Pattern Recognition,* 2020. The first ML model outputs a first score that indicates a first likelihood (e.g., between 0-1) that the first frame shows at least one of the plurality of uncovered body part types. In this example illustration, the computer system further determines that the second ML model will also be executed (e.g., to provide a higher level of precision) based at least in part on a value of the first score (e.g., being greater than a predetermined threshold value).

Accordingly, the second ML model of the computer system further analyzes the first frame of the sequence of frames. In some embodiments, the second ML model includes a neural network architecture that is compound-scaled (e.g., uniformly scaled) according to a plurality of dimensions (e.g., depth, width, and resolution). For example, the computer system may include a baseline neural network model (e.g., including a convolutional neural network (CNN)) that includes a particular depth (e.g., number of layers) and a width (e.g., a number of channels). Also, the first frame may have a particular resolution. The computer system may then uniformly scale the resolution of the image, the depth of the baseline network, and the width of the baseline network, for example, each scaling utilizing the same compound coefficient. In some embodiments, the compound coefficient may be chosen based in part on an amount of resources available for model scaling (e.g., which may be associated with a target number of parameters of the model) and/or a desired prediction accuracy (e.g., precision) performance. The output of this compound scaling process may be the compound-scaled neural network architecture. In some embodiments, the second ML model may utilize this compound-scaled CNN to generate a second score (e.g., between 0-1) for the first frame. In some embodiments, by utilizing a compound-scaled model to generate the second score, techniques may produce the second score with a higher level of precision while also conserving resources (e.g., utilizing less memory due to less model parameters being analyzed). Accordingly, the first ML model and the second ML model may be used in tandem to achieve both a high recall and high precision when generating frame scores, while also conserving computing resources. For more information on generating the second ML model using compound scaling, see, for example, Tan, Mingxing, and Le, Quoc V., "EfficientNet: Rethinking Model Scaling for Convolutional Neural Networks," arXiv:1905.11946 [cs.LG].

Continuing with the above illustration, upon generating both the first score and the second score (e.g., respectively, via the first ML model and the second ML model), the computer system merges the frames scores together to generate a third score (e.g., a final score) for the first frame. The merging process may be performed according to any suitable method. In one example, the second score may be compared against one or more threshold values. Depending on the relative value of the second score with respect to the one or more threshold values, the computer system may modify the second score such that the final score takes into account the value of the first score.

In some embodiments, the computer system may generate a frame score for each frame, and then determine a clip score based on the frames scores for each frame in the video clip. In some embodiments, the clip score may correspond to the maximum frame score of the plurality of frame scores from the video clip. This may indicate the likelihood that at least one frame in the video clip shows nudity.

In some embodiments, the computer system may generate one or more video clip segments from the original video clip received by the computer system. For example, suppose that the computer system identifies a plurality of portions (e.g., subsets) of the original video clip that likely contain nudity. Each portion may include one or more frames of the original video clip. The computer system may splice the original video clip into a plurality of video clip segments, each video clip segment corresponding to a portion of content that may be likely to contain at least one frame showing nudity. In some embodiments, a score may be determined for each video clip segment.

In some embodiments, the plurality of video clip segments may be presented on a display such that each video clip segment is distinct (e.g., accessible via a clickable thumbnail image associated with the respective video clip segment). For example, using the illustration above, suppose that the multimedia distribution service employs an agent (e.g., a human operator) to review video content as part of a compliance process, to ensure that the video content is suitable for distribution in one or more regions (e.g., including India). In this example, instead of the agent being presented with a single (e.g., monolithic) video, in which the agent reviews the video content from end-to-end (e.g., consuming significant time and/or computing resources), the computer system may instead present on a display device a plurality of video clip segments. For example, the video clip segments may be presented via a dashboard of a graphical user interface (GUI). As described herein, each video clip segment may be associated with a particular thumbnail image, which, in one example, may correspond to a particular frame of the video clip segment that had the maximum score (e.g., the highest probability of nudity). In this way, embodiments may save significant amounts of time and/or computing resources, to assist agents in performing compliance reviews.

Embodiments of the present disclosure provide several technical advantages over conventional techniques. For example, techniques described herein provide a more efficient and accurate process for detecting uncovered body part types in a video frame. In one example, techniques described herein provide a process for detecting uncovered body part types that improves upon both recall and precision. As described herein, a first ML model may be trained to be optimized for recall, helping to ensure that a more complete set of frames that respectively show nudity are detected. In some embodiments, the training process of the first ML further improves upon conventional techniques, for example, by utilizing a loss function that penalizes the first ML model if a particular region of a CAM incorrectly identifies the particular region as showing an uncovered body part type. This enhanced training process may further improve the recall statistic for frame score generation. This may be important, for example, to ensure that regional compliance standards are thoroughly tested. This may also be important to ensure that end-users (e.g., parents, children, etc.) are presented with content that is appropriate for each end-user, and/or provided with information that enables each user to select what content they want to view (or not view). Additionally, a second ML model may further improve upon precision, ensuring that a subset of cases that are known to be difficult (e.g., based in part on error rates of the first ML model) are further processed. As described herein, the second ML model (e.g., a compound-scaled CNN) may be more optimally balanced to improve precision, while also efficiently using resources (e.g., reducing memory and/or processor resources due in part to reducing the number of model parameters employed). Accordingly, techniques may provide better recall and precision when generating frame scores, while also efficiently utilizing computing resources in the process.

In another example of a technical advantage, techniques provide a more efficient process for providing video content for evaluation (e.g., performing regional compliance review). For example, techniques provide a process for generating video clip segments from a video clip, each video clip segment including a subset of frames of the video clip that is identified as being likely to show one or more frames including nudity. Furthermore, techniques also provide a process for presenting a particular frame of the video clip segment that is identified as being the most likely to show nudity (e.g., having the highest frame score). In this way, techniques may significantly reduce the amount of time required by a person (e.g., an agent, a family member, etc.) to identify whether the original video clip (e.g., an entire movie) contains any form of nudity by pinpointing specific frames and/or subsets of frames that are candidates for further review. It should be understood that this process may applied with respect to multiple regions and/or customer types. Also, the process may be performed over a large number of videos (e.g., received by the multimedia distribution service) that grows daily. Accordingly, the aggregate amount of time and/or computing resources that may be more efficiently utilized is significant.

For clarity of illustration, embodiments described herein may typically refer to a process for detecting an uncovered body part type (e.g., nudity in a frame). However, embodiments should not be construed to be so limited. For example, techniques described herein may be applicable to any suitable object type shown in a frame (e.g., a type of clothing worn, an object being held in a hand, etc.). Also, although techniques described herein may primarily be described in the context of a multimedia distribution service enabling a more efficient compliance review of video content, embodiments should not be construed to be so limited. For example, techniques are also applicable to other applications, including, but not limited to, providing end-users with warnings regarding content that may not be suitable for a particular audience. In another example, techniques may be used to blur a portion of a frame that may include inappropriate content for a particular audience, and/or to skip through portions of a video content that are known to contain inappropriate content.

FIG. 1 is a schematic diagram illustrating an example system for detecting an uncovered body part type in a frame of video content, in accordance with various embodiments. In diagram 100 of FIG. 1, the example system includes a detection system 101, a video file 102, and a graphical user interface (GUI) 108. As described further herein, the detection system 101 may receive a frame of video content of the video file 102, analyze the frame to determine a score indicating a likelihood of the frame showing a type of uncovered body part, and then present at least a portion of video content to the GUI 108 for display.

Turning to the video file 102 in further detail, the video file 102 may correspond to any suitable container for a particular video content. Some non-limiting examples of video file formats may be MPEG-4 Part 14 ("MP4"), Quick-Time ("MOV"), Audio Video Interleave ("AVI"), etc. Some non-limiting examples of video contents may include movies, TV shows, video advertisements, documentaries, home videos, etc. In some embodiments, the video file 102 may include both a video track and an audio track. In some embodiments, the video file 102 may not include an audio track.

The video content of video file 102 may include a sequence of one or more frames. In the example of diagram 100, the video file 102 may be divided into one or more video clips, including video clip 104. The video clip 104 itself may contain one or more frames (e.g., a sequence of one or more frames), including frame A 106. Each frame may show any suitable content. For example, frame A 106 shows a person's face and a portion of their torso. As described further, in reference to FIG. 2, the video file 102 may be partitioned into any suitable one or more video clips.

Turning to the detection system 101 in further detail, the detection system 101 may correspond to any suitable computer system. For example, this may include a personal computer (PC), a server computer, or a cluster of server computers. In one example, the cluster of server computers may operate within a computing cloud.

As described further herein, the detection system 101 may receive video clip 104 and extract frame A 106 from the video clip 104. The detection system 101 may then analyze frame A 106 and output a score that indicates a likelihood that frame A 106 shows a type of uncovered body part. In some embodiments, the detection system 101 may be trained to detect one or more types of uncovered body parts of a plurality of predefined types (a bare buttocks, bare breast, and/or male/female genitalia). The detection system 101 may analyze each frame of the video clip 104 and determine a score for per frame. In some embodiments, the detection system 101 may determine a frame of the video clip 104 that has a maximum score among other frames of the video clip 104. In some embodiments, the detection system 101 may determine whether the video clip 104 as a whole includes at least one uncovered body part (e.g., showing nudity) based in part on the frame with the maximum score. If so, then the detection system 101 may provide the video clip 104 for presentation on a display device (e.g., a user device such as a tablet, a monitor connected to a PC, etc.).

In some embodiments, and, as further depicted in reference to FIG. 1, the detection system 101 may provide one or more video clip segments for presentation via the GUI 108 (e.g., of a user device). For example, consider a scenario in which the detection system 101 detects a plurality of portions of the video clip 104 that are respectively likely to have at least one frame showing content containing nudity. The detection system 101 may splice the video clip 104 into a plurality of video clip segments, each segment corresponding to a portion of the video clip 104 that is likely to include at least one frame that is likely to show an uncovered (e.g., nude) portion of a body of a person. Each video clip segment may further include a frame that is associated with a maximum score, similar to as described herein. This frame may correspond to the frame with the highest likelihood of showing content with nudity within the video clip segment. The detection system 101 may then provide these video clip segments for presentation via the GUI 108.

Turning to the GUI 108 for further illustration, the GUI 108 may show a dashboard presentation. Upon receiving a selection of a particular video clip segment (e.g., video clip segment 112), the dashboard may enable presentation of the particular video clip segment, for example, within a large screen presentation window 110 of the dashboard. Video clip segment 112 may represent one of a plurality of video clip segments that are generated from the video clip 104 (and/or video file 102), as described herein. In some embodiments, video clip segment 112 may be associated with a particular confidence level for the particular segment (e.g., 99% confidence, as depicted with respect to video clip segment 112). This may indicate a confidence level that the particular video clip segment contains at least one frame that shows nudity of a particular type. In some embodiments, the video clip segment 112 may further indicate a timestamp of a thumbnail of the video clip segment 112 shown in the GUI 108 (e.g., "00:03:25"). As described herein, this thumbnail may correspond to the frame with the highest probability of showing nudity content. In some embodiments, by showing the thumbnail with the highest probability, an agent (e.g., a human operator) may be able to more efficiently review the video clip segment (e.g., by performing an immediate visual inspection of the thumbnail). In some embodiments, where the agent may request for further information, the GUI 108 may receive input to select (e.g., via a click or tap) the thumbnail, upon which the video clip segment may be presented within the large screen presentation window 110. In some embodiments, this may enable the agent to view the surrounding video content associated with the thumbnail (and/or other portions of the video clip segment 112), to determine with higher confidence if the video clip segment contains content with nudity. The agent may scan through frames of the video clip segment to further increase the analysis velocity. In this way, techniques may enable a more efficient compliance review of portions of a video clip 104 (e.g., and/or video file 102) that are flagged as potentially showing uncovered portions of a body of a person.

It should be understood that the dashboard shown via GUI 108 is one example application of techniques described herein, for example, whereby a compliance officer may efficiently analyzed video contents flagged by the detection system 101. However, embodiments should not be construed to be so limited. For example, in another scenario, the GUI 108 may represent a user application interface, whereby an end-user (e.g., a parent of a young child) may be shown thumbnails of video clip segments that may not be suitable for a general audience, based on the analysis of detection system 101. The end-user may thus be able to quickly evaluate whether a video title (e.g., a movie) is appropriate for their child's viewing. In some embodiments, the GUI 108 may enable a user to filter video clip segments by type of content. For example, the user may filter to see primarily video content that shows bare buttocks. Any suitable variations of presentation of video clips and/or video clip segments may be performed via techniques described herein.

Figure 2:
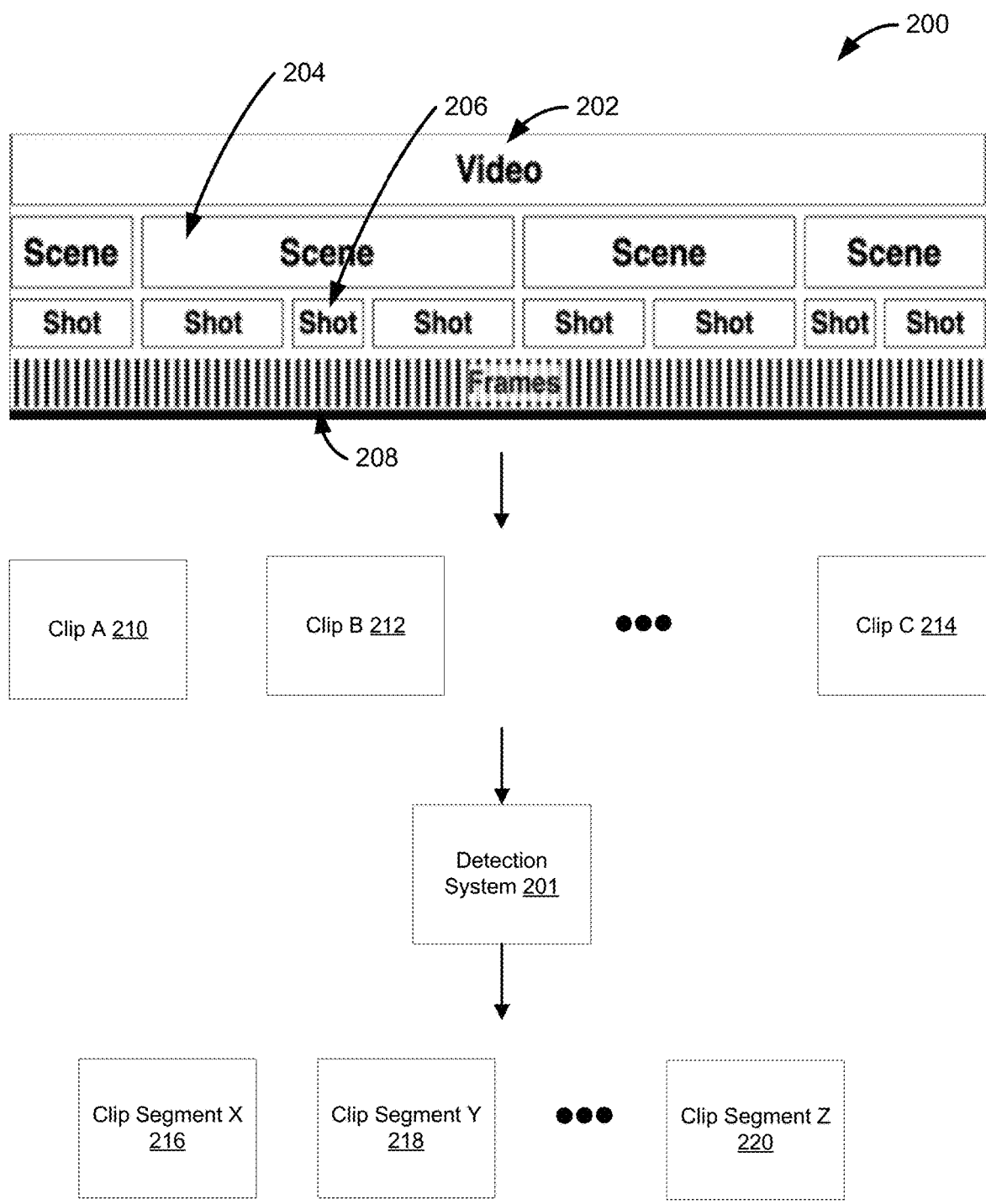
FIG. 2 is a block diagram illustrating an example technique for generating one or more video clip segments based on detecting an uncovered portion of a body of a person within a video content, in accordance with various embodiments.

FIG. 2 is a block diagram illustrating an example technique for generating one or more video clip segments based on detecting an uncovered portion of a body of a person within a video content, in accordance with various embodiments. In diagram 200 of FIG. 2, a video content 202 is illustrated, which may be similar to video file 102 of FIG. 1. In this example, the video content 202 (e.g., a movie title) may include one or more scenes. In some embodiments, a scene may be semantically defined, for example, including one or more shots that have semantic meaning (e.g., defined by a director of the movie). For example, scene 204 may be one of the scenes of the video content 202, and may include at least three shots, including shot 206. In some embodiments, a shot (e.g., shot 206) may correspond to a sequence of frames unbroken by editing. For example, the shot 206 may include a sequence of frames 208.

In some embodiments, a video clip (e.g., clip A 210, clip B, 212, clip C 214, etc.) of the video content 202 may include a sequence of one or more frames, each clip having a start and stop time among the frames of the video content 202. In some embodiments, the start and stop times for a particular clip may be independent (or dependent) of particular shot and/or scene boundaries. For example, clip A 210 (e.g., which may be similar to video clip 104 of FIG. 1) may span at least a portion of two shots, while clip B 212 may span at least a portion of three shots. In some embodiments, a video clip may be of any suitable length (e.g., the entire video content 202, or a suitable subset of a sequence of frames).

In some embodiments, a detection system 201 (e.g., which may be similar to detection system 101 of FIG. 1) may receive a video clip (e.g., video clip A 210) and extract one or more frames of the video clip. As described further herein, the detection system 201 may process each frame of the video clip to generate a frame score. In some embodiments, the detection system 201 may identify the frame with the maximum score for video clip A 210. If the maximum score is greater than a particular threshold, then the detection system 201 may determine that the clip A 210 may be a candidate for further review.

In another example, as described herein, the detection system 201 may splice a video clip (e.g., video clip B 212) into one or more video clip segments (e.g., video clip segment X 216, clip segment Y 218, clip segment Z 220, etc.), for example, to improve the efficiency of performing a subsequent evaluation of nudity content within the particular video clip. For example, suppose that video clip B 212 contains a plurality of portions (e.g., one or more frames in each portion), each portion containing at least one frame that is scored by the detection system 201 as being likely to show an uncovered portion of a body of a person. Suppose further that the plurality of portions are spaced from each other (e.g., with one or more frames that are not likely to show nudity in between each portion). The detection system 201 may perform a splicing process to generate video clip segments (e.g., video clip segment X 216, video clip segment Y 218, video clip segment Z 220, etc.) for each portion of the video clip B 212 that is likely to show content containing nudity. As discussed further herein, a process for determining when to create a new video clip segment may be performed similarly to as discussed in reference to FIG. 8.

Figure 3:
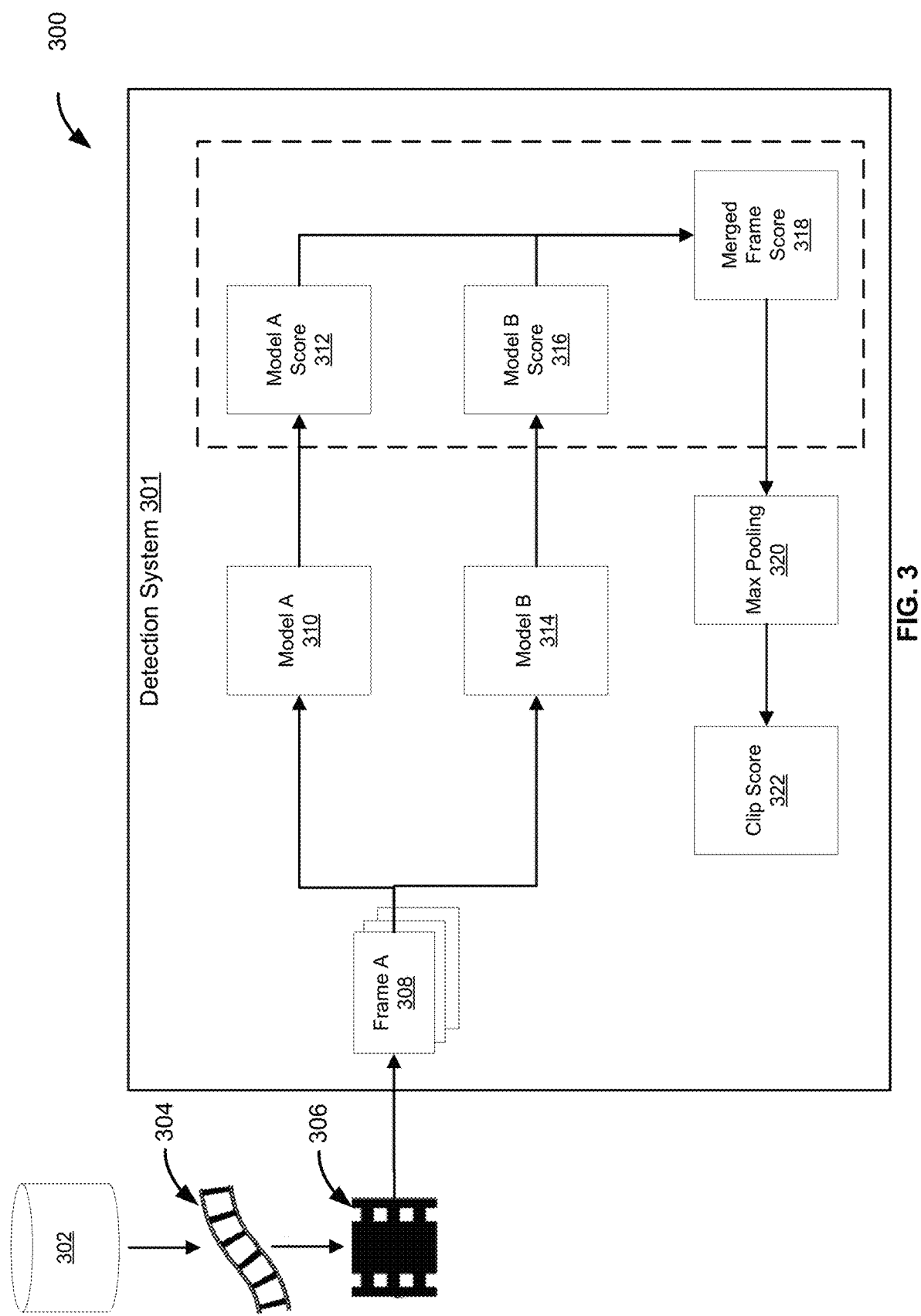
FIG. 3 is a block diagram illustrating an example architecture of a detection system, in accordance with various embodiments.

FIG. 3 is a block diagram illustrating an example architecture of a detection system, in accordance with various embodiments. In diagram 300 of FIG. 3, a data store 302, a video title 304, a video clip 306, and a detection system 301 are depicted. The data store 302 may be any suitable data repository that may receive and/or store video content (e.g., movies, home videos, etc.), for example, by a multimedia distribution service. As an example, the data store 302 may contain the video title 304, which may be recently uploaded to the data store 302 for further compliance evaluation, to ensure that the video title 304 conforms to regional standards and/or otherwise is appropriate for a particular user audience. The video title 304 may contain one or more video clips, including video clip 306, which may be similar to any of the video clips described in reference to FIG. 2 (e.g., clip A 210, clip B 212, etc.). As described further herein, the detection system 301 may receive the video clip 306, analyze the video clip 306, and then output a clip score 322.

Turning to the architecture of detection system 301 in further detail, and, using the above example for illustration, the detection system 301 may receive the video clip 306, which may include one or more frames (e.g., a sequence of frames) that includes frame A 308. The detection system 301 extracts frame A 308 (e.g., a first frame of the video clip 306), and then model A 310, a first ML model of the detection system 301 (described further in reference to FIG. 4), receives frame A 308 for further analysis.

Figure 4:
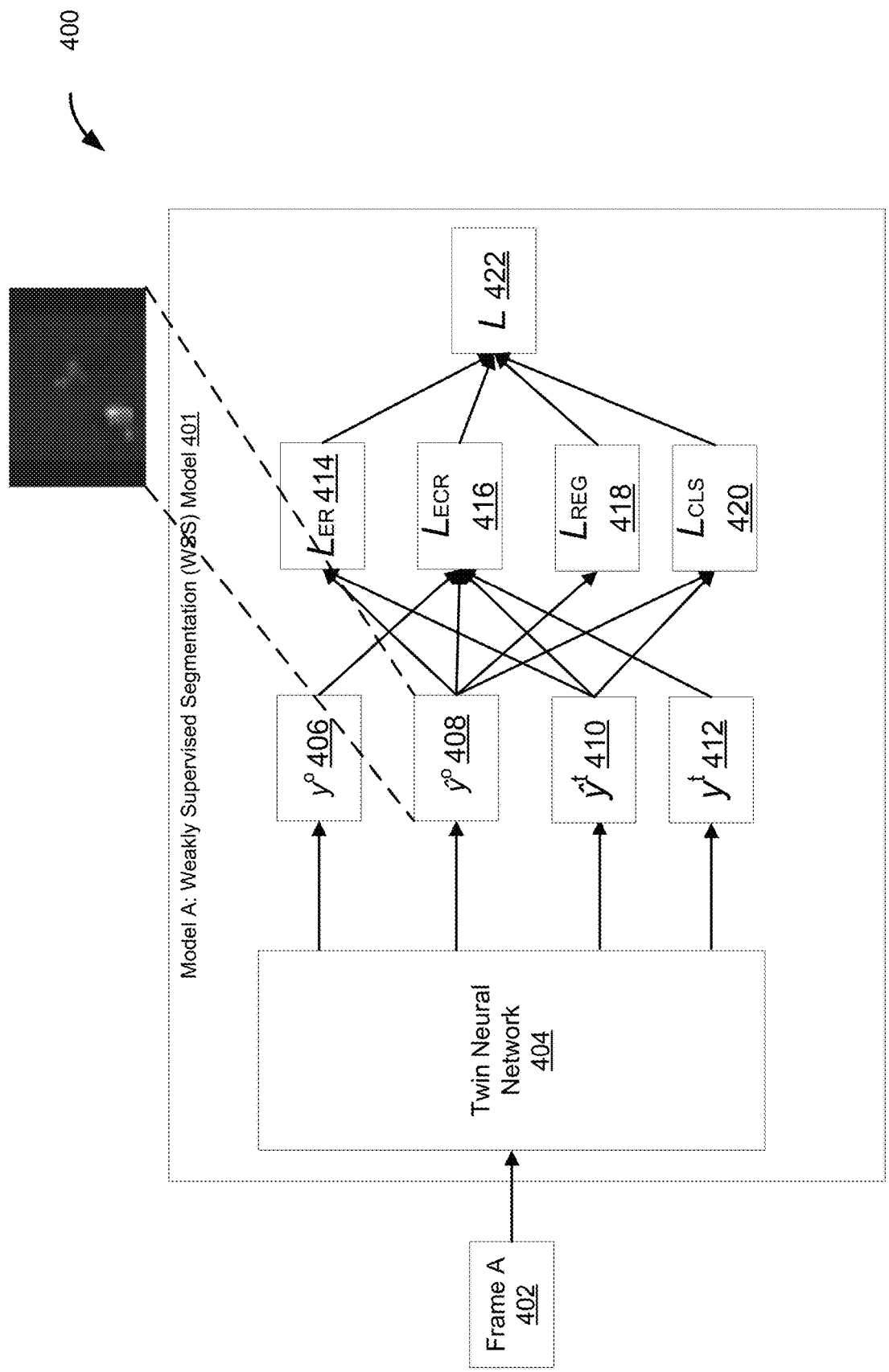
FIG. 4 is a block diagram illustrating an example architecture of a machine learning model of a detection system, in accordance with various embodiments.

FIG. 4 is a block diagram illustrating an example architecture of a machine learning model of a detection system, in accordance with various embodiments. As described herein, model A 401 of diagram 400 shows an example of a first ML model of a detection system (e.g., detection system 301). Model A 401 may be similar to (e.g., the same as) model A 310 of FIG. 3, and model A 401 may be trained to be optimized for generating a frame score that has a high recall rate (e.g., a high recall statistic, such as 97%). In some embodiments, the recall statistic may correspond to the number of true positives divided by the number of true positives plus the number of false negatives. True positives may be data points that are classified as positive by the model A 401 that are actually positive, and false negatives are data points that the model identifies as negative that are actually positive (e.g., incorrect). The recall statistic may be associated with the ability of the model A 401 to find substantially all of the relevant cases within a dataset. It should be understood that other statistical measurements (e.g., precision) may also be evaluated with respect to model A 401. As described further herein, the model A 401 may be selected to be more optimized for recall, while a second ML model of the detection system 301 (e.g., model B 314) may be more optimized for precision. In some embodiments, precision may correspond to the number of true positives divided by the number of true positives plus the number of false positives (e.g., data points that the model incorrectly identifies as positive). Precision may express the proportion of data points that the model says were relevant that were actually relevant. In some embodiments, employing two ML models that are respectively optimized for recall and precision may be useful in cases where real-world datasets include imbalanced data. For example, suppose that a super majority of videos received by the detection system for evaluation (and/or training) contain content that does not show nudity, while a small percentage of the received content shows nudity. In these types of cases, it is useful to have one type of model that enables higher recall, and also having another model that may be (e.g., conditionally) executed on more difficult cases (e.g., to ensure higher precision).

In one example implementation of model A 401, a weakly supervised segmentation (WSS) model may be employed. See, e.g., Wang, Yude, et. al., "Self-supervised Equivariant Attention Mechanism for Weakly Supervised Semantic Segmentation," *Proceedings of the IEEE/CVF Conference on Computer Vision and Pattern Recognition, 2020*. For example, the model 401 may include a twin neural network 404 (e.g., which may also be known as a "Siamese network architecture"). The twin neural network 404 may be trained based in part on image-level labels. For example, suppose that frame A 402 corresponds to an image used for training model A 401. The model A 410 may perform an affine transform on the image to geometrically transform the image, for example, while preserving lines and parallelism of the image. The original image may be input into a first neural network (e.g., a first CNN) of the twin neural network 404. The first CNN may generate a first class activation map (CAM), which may be referred to as $\hat{y}^o$ 408 in FIG. 4, which may be an original CAM (e.g., generated from the first CNN branch with original image input). In some embodiments, each pixel (and/or part) in a CAM (e.g., a pixelated map) may be proportional to the saliency of this pixel to the final output of the probability score for the frame. In some embodiments, as depicted in diagram 400 with respect to $\hat{y}^o$ 408 (e.g., as a representative CAM), each pixel of a CAM may be associated with a particular color, whereby the color may indicate the saliency of the part of the image to the probability score. For example, a darker color may indicate a lower saliency (e.g., not showing nudity), while a lighter color may indicate a higher saliency (e.g., likely showing nudity). An output (e.g., an output CAM) of the first CNN may be further input into a pixel correlation module (PCM). The PCM may produce a modified CAM (a second CAM $y^o$ 406) via a deep learning attention mechanism that correlates the pixels of the original CAM in a non-linear manner to produce the second CAM $y^o$ 406.

Similarly, a second neural network (e.g., a second CNN) of the twin neural network 404 may generate another CAM based on the affined transformed image of frame A 402 that is received as input. In this case, the CAM generated by the second CNN is depicted in diagram 400 as a third CAMP 410. Also, an output CAM of the second CNN may be further input into another PCM. This PCM may produce a fourth CAM $y^t$ 412.

In some embodiments, the model A 401 may be trained based in part on one or more loss functions. In some embodiments, a loss function may be computed based in part on one or more of the CAMs (e.g., pixel values of a CAM)

that are output by the twin neural network 404, as described herein. For example, in some embodiments, at least four loss functions may be employed during training of model A 401. These loss functions may include: a first loss function (e.g., equivariant regularization (ER) loss function $L_{ER}$ 414 of diagram 400), a second loss function (e.g., equivariant cross regularization (ECR) loss function $L_{ECR}$ 416), a third loss function (e.g., regularization function $L_{REG}$ 418, directly applied to a CAM), and a fourth loss function (e.g., $L_{CLS}$ 420). In some embodiments, the first three loss functions may respectively be computed as:

$$L_{ER}414 = \|A(\hat{y}^o) - \hat{y}^t\|_1 \qquad (1)$$

$$L_{ECR}416 = \|A(y^o) - \hat{y}^t\|_1 + \|A(\hat{y}^o) - y^t\|_1 \qquad (2)$$

$$L_{REG}418 = \|CAM\|_2 * I_0(y_{gt}) \qquad (3)$$

In some embodiments, one more methods may be utilized to determine the magnitude of activation regularization for each loss function. For example, as depicted by equations (1) and (2) above, $L_{ER}$ 414 and $L_{ECR}$ 416 each may compute one or more L1 vector norms (e.g., a sum of the absolute activation values over all the pixel differences between the CAMs). In some embodiments, the L1 norm may be used as a penalty for activation regularization.

In some embodiments, as depicted by equation (3) above, the $L_{REG}$ 418 loss function may compute the L2 vector norm (e.g., a sum of the squared activation values). In some embodiments, the L2 norm of $L_{REG}$ 418 may computed over the pixels of a suitable CAM (e.g., $\hat{y}^o$ 408). The L2 norm may be multiplied by $I_0(y_{gt})$, whereby $y_{gt}$ corresponds to whether the image contains nudity or not. $I_0$ may correspond to the identity function, such that if the image (e.g., training frame A 402) shows nudity, then $I_0(y_{gt})$ may take the value 1, whereas if the image does not show nudity, then $I_0(y_{gt})$ may take the value zero. In this way, the $L_{REG}$ 418 loss function may be utilized to directly train the first machine learning model A 401 by penalizing the model A 401 for incorrectly identifying a region of the CAM (e.g., $\hat{y}^o$ 408) as being associated with one of a plurality of uncovered body part types. In some embodiments, the fourth loss function $L_{CLS}$ 420 may correspond to any suitable classification loss function (e.g., a cross-entropy loss function).

Upon computing at least the four loss functions described above, a final loss function L 422 may be computed as:

$$L422 = L_{ER}414 + L_{ECR}416 + L_{REG}418 + L_{CLS}420 \qquad (4)$$

Accordingly, equation (4) may sum the loss of each of the loss functions described above. The final loss function L 422 outputs a loss that is subsequently used to train model A 401 (e.g., to minimize the loss value for subsequent inputs). Upon completion of the training process, the trained model A 401 may utilize the architecture described herein (e.g., the twin neural network 404) during the inference stage generate a frame score for a given frame.

Continuing with the illustration above, with respect to diagram 300 of FIG. 3, the trained model A 310 outputs a model A frame score 312, which may be a value that corresponds to a probability between 0 and 1. The model A score 312 may indicate a likelihood that frame A 308 shows at least one of a plurality of uncovered body part types. It should be understood that the trained model A 310 may be trained to recognize frames showing any one or more of the plurality of uncovered body part types (e.g., bare buttocks, bare breasts, female and/or male genitalia, etc.). In some embodiments, model A 310 may perform CAM pooling to generate the model A score 312. For example, model A 310 may perform CAM pooling by computing the average value of pixels (e.g., parts) of one or more CAMs. For example, the trained model A 310 may compute the average value of CAM $\hat{y}^o$ 408 of FIG. 4. In another example, the trained model A 310 may compute the average value over each of the CAMs produced by model A 310 for a particular image (e.g., frame A 308), and then combine the values together (e.g., producing an average of averages). It should be understood that any suitable method may be used to compute the model A score 312. Also, note that the dotted lined box depicted in diagram 300, which encloses model A score 312 and model B score 316 (discussed further herein) to produce a merged frame score 318, signifies that these intermediate and/or final frame scores are produced as a result of CAM pooling for a particular frame, before performing max pooling over a plurality of frames (described further herein).

Figure 5:
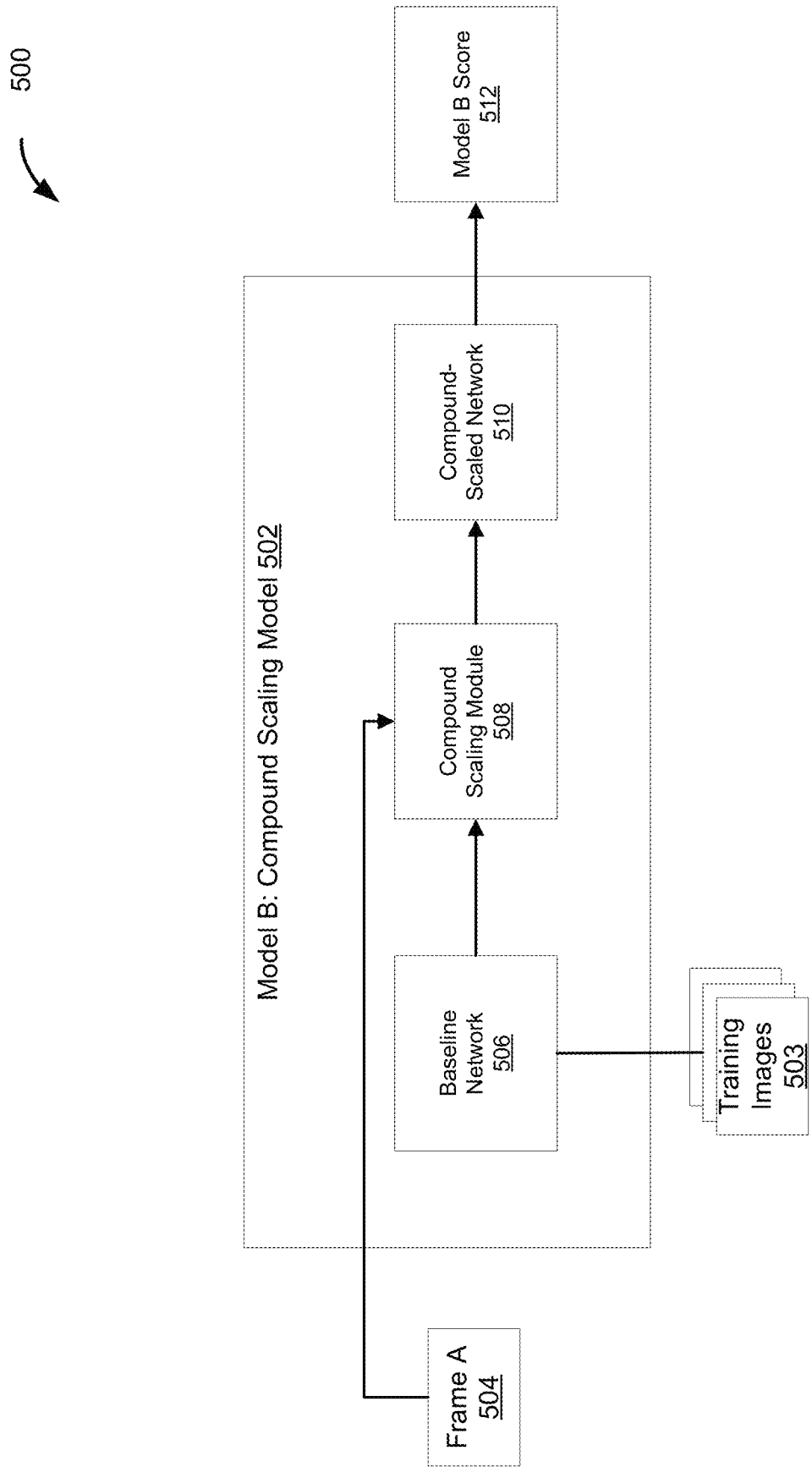
FIG. 5 is a block diagram illustrating another example architecture of a machine learning model of a detection system, in accordance with various embodiments.
Figure 6:
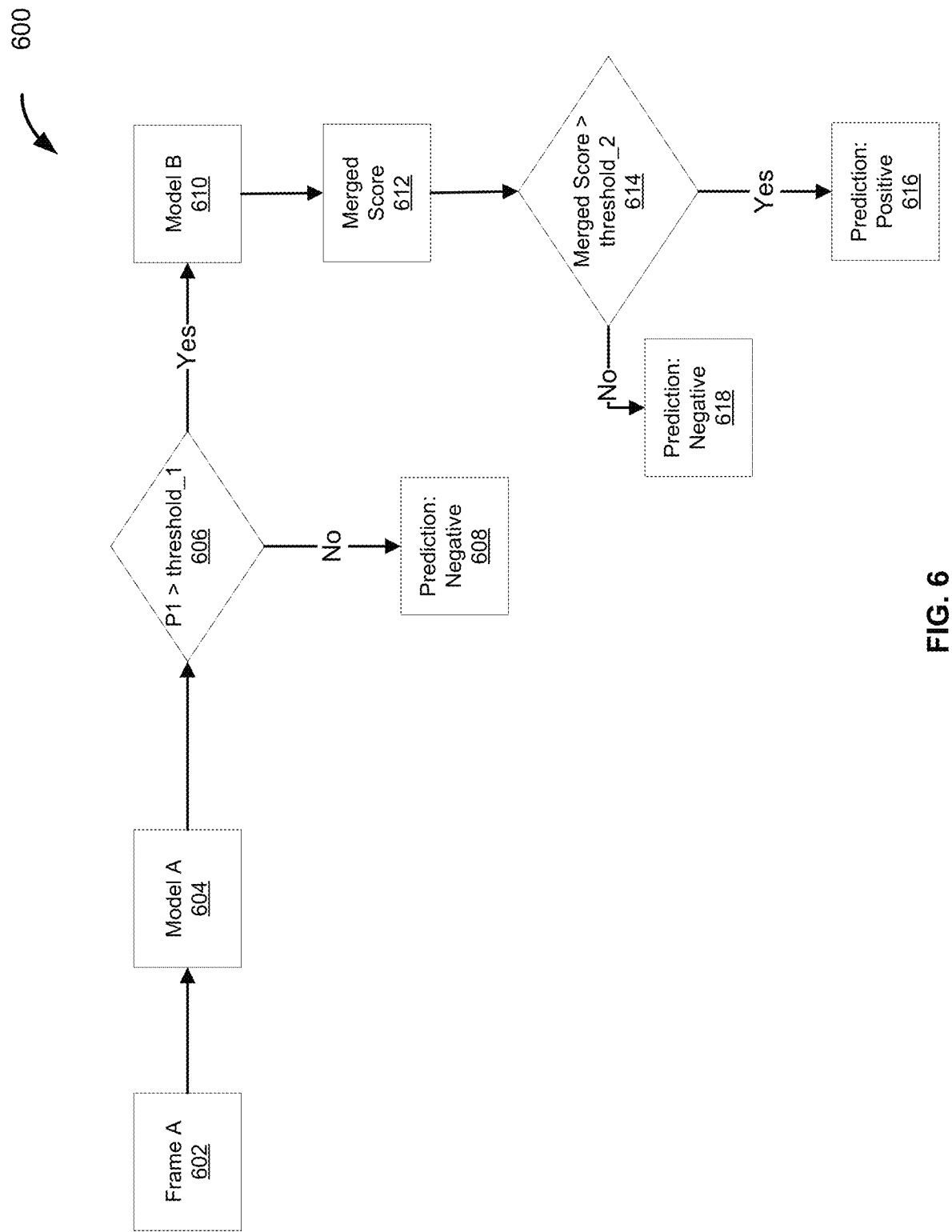
FIG. 6 is a flow diagram illustrating a technique for determining if a video content shows an uncovered portion of a body of a person, in accordance with various embodiments.

In some embodiments, as described further herein with respect to FIGS. 6 and/or 7, the detection system 301 may determine whether to further execute model B 314 to process frame A 308. For example, if the detection system 301 determines that there is an acceptable confidence that the model A score 312 is accurate, the detection system 301 may determine that the model A score 312 is the final score, in which case the merged frame score 318 may be the same as the model A score 312. In some embodiments, the detection system 301 may determine to further execute model B 314. As described further herein with respect to FIG. 5, model B 314 may be trained (e.g., optimized) to produce scores with a higher level of precision.

FIG. 5 is a block diagram illustrating another example architecture of a machine learning model of a detection system, in accordance with various embodiments. As introduced above, diagram 500 of FIG. 5 shows an example of a second ML model of a detection system (e.g., detection system 301). Model B 502 may be similar to (e.g., the same as) model B 314 of FIG. 3, and frame A 504 may be similar to (e.g., the same as) frame A 308.

In some embodiments, model B 502 may be trained to be optimized for higher precision based at least in part on employing a compound scaling method. For more information on using compound scaling to improve model precision, see, for example, Tan, Mingxing, and Le, Quoc V., "EfficientNet: Rethinking Model Scaling for Convolutional Neural Networks," arXiv:1905.11946 [cs.LG]. In some embodiments, model B 502 may include a baseline network 506 (e.g., a CNN). The baseline network 506 may be trained based in part on training images (e.g., frames) 503. In some embodiments, these training frames 503 may include frames that are associated with a particular error pattern of the first ML model (e.g., hands, faces, etc.). These may correspond to "difficult" cases that were difficult to accurately classify. In some embodiments, the training frames 503 may include frames for which the score from the first ML model is greater than a particular threshold value (e.g., greater than 0.1). Any suitable training data may be used to train the baseline network 506 and/or the compound scaled network 510.

In some embodiments, the baseline network 506 may be scaled by a compound scaling module 508 to generate a compound-scaled neural network 510 (e.g., a new CNN). In some embodiments, the baseline network 506 may be compound-scaled according to a plurality of dimensions (e.g., depth, width, and resolution). For example, the baseline network 506 may include a particular number of channels (e.g., of width W) and a particular number of layers (e.g., of depth D). Also, frame A 504 may have a particular resolution (R) In some embodiments, the compound scaling module

508 may uniformly scale the baseline network 506 (e.g., depth D and width W) and the frame A 504 (e.g., resolution R) based in part on a compound scaling coefficient f. In some embodiments, this compound scaling process may produce the compound scaled network 510 (e.g., a CNN) that achieves higher precision, while also limiting the amount of memory and/or processing resources consumed (e.g., limiting the number of parameters being analyzed by the model B 502).

In some embodiments, the compound scaled network 510 may also (and/or alternatively) be trained based on any suitable training data. For example, the training images 503, described herein, may be used to train the compound scaled network 510. In some embodiments, the compound scaled network 510 may also be trained based at least in part on one or more loss functions that utilize a CAM, as described in reference to FIG. 4.

In some embodiments, some embodiments, the trained compound scaled network 510 may receive a frame (e.g., frame A 504) and generate a model B score 512 for the frame. In one example, the compound scaled network 510 may generate one or more CAMs based on frame A 504, similar to as described in reference to FIG. 4. The model B 502 may also similarly perform average pooling on the one or more generated CAMs to output model B score 512, which may be a value between 0 and 1.

Returning to the illustration of FIG. 3, model B 314 may generate model B score 316 from frame A 308 (e.g., similar to the generation of model B score 512 from frame A 504 of FIG. 5). For example, the model B score 512 may be generated based on a CAM pooling method that produces the score 512 based on an average value of pixels of a CAM produced by model B 314.

Following the generation of model B score 316 the detection system 301 may merge both the model A score 312 and model B score 316 to generate a merged frame score 318. In some embodiments, as described further in reference to FIGS. 6 and 7, the merged frame score 318 may be determined based in part on one or more threshold values (e.g., and/or ranges of values between one or more threshold values). It should be understood that any suitable method may be used to merge frame scores. For example, the scores may be averaged together. In another example, the two frame scores may be assigned weights, and the scores may be merged based in part on the weights.

Upon generating the merged frame score 318 for frame A 308, the detection system 301 may repeat a similar process for subsequent frames of video clip 306. Accordingly, the detection system 301 may generate a plurality of frame scores for each frame in the video clip 306. Then, the detection system 301 may perform a max pooling process 320 to generate a clip score 322 for the video clip 306. In some embodiments, the max pooling process 320 may determine the maximum frame score among all the frame scores in the video clip 306, and then may assign the clip score 322 for the video clip 306 as being the maximum frame score. For example, suppose that frame A 308 was assigned a merged frame score 318 of 90%. Suppose further that the merged frame score 318 of 90% is greater than or equal to the frame scores of other frames in the video clip 306. In this example, the video clip 306 may be assigned a clip score 322 of 90%. In this example, this score may indicate that there is a 90% likelihood that at least one frame of the video clip 306 shows an uncovered portion of a body (e.g., showing nudity in the image), whereby the uncovered portion is one of a plurality of uncovered body part types. In some embodiments, the detection system 301 may compare the clip score 322 against a predetermined threshold value (e.g., 96%), whereby, upon determining that the clip score 322 matches (e.g., is greater than or equal to) the threshold value, the detection system 301 may present the video clip 306 on a dashboard for further compliance evaluation by an end user (e.g., as described in reference to GUI 108 of FIG. 1). For example, these body part types (e.g., bare breast, bare buttocks, etc.) may be identified as being prohibited from being presented in a certain geographical region within video content. Accordingly, the detection system 301 may determine to present the video clip 306 for further evaluation by the end user, to ensure that the video clip 308 is suitable for presentation in the certain geographical region. In some embodiments, the detection system 301 may automatically determine whether the video clip 308 is (or is not suitable) for presentation in the particular geographical region (e.g., for example, if the clip score 322 is greater than or equal to a certain threshold value, such as 99%).

In some embodiments, the detection system 301 may generate one or more video clip segments based in part on the video clip 306. For example, suppose that video clip 306 corresponds to video clip A 210 of FIG. 2. In this example, the detection system 301 may generate a plurality of video clip segments (e.g., clip segment X 216, clip segments Y 218, clip segment Z 220, etc.) based on the video clip 306. In some embodiments, this segmentation method may be used when there may be a plurality of portions of the video clip 306 that may show nudity.

Figure 8:
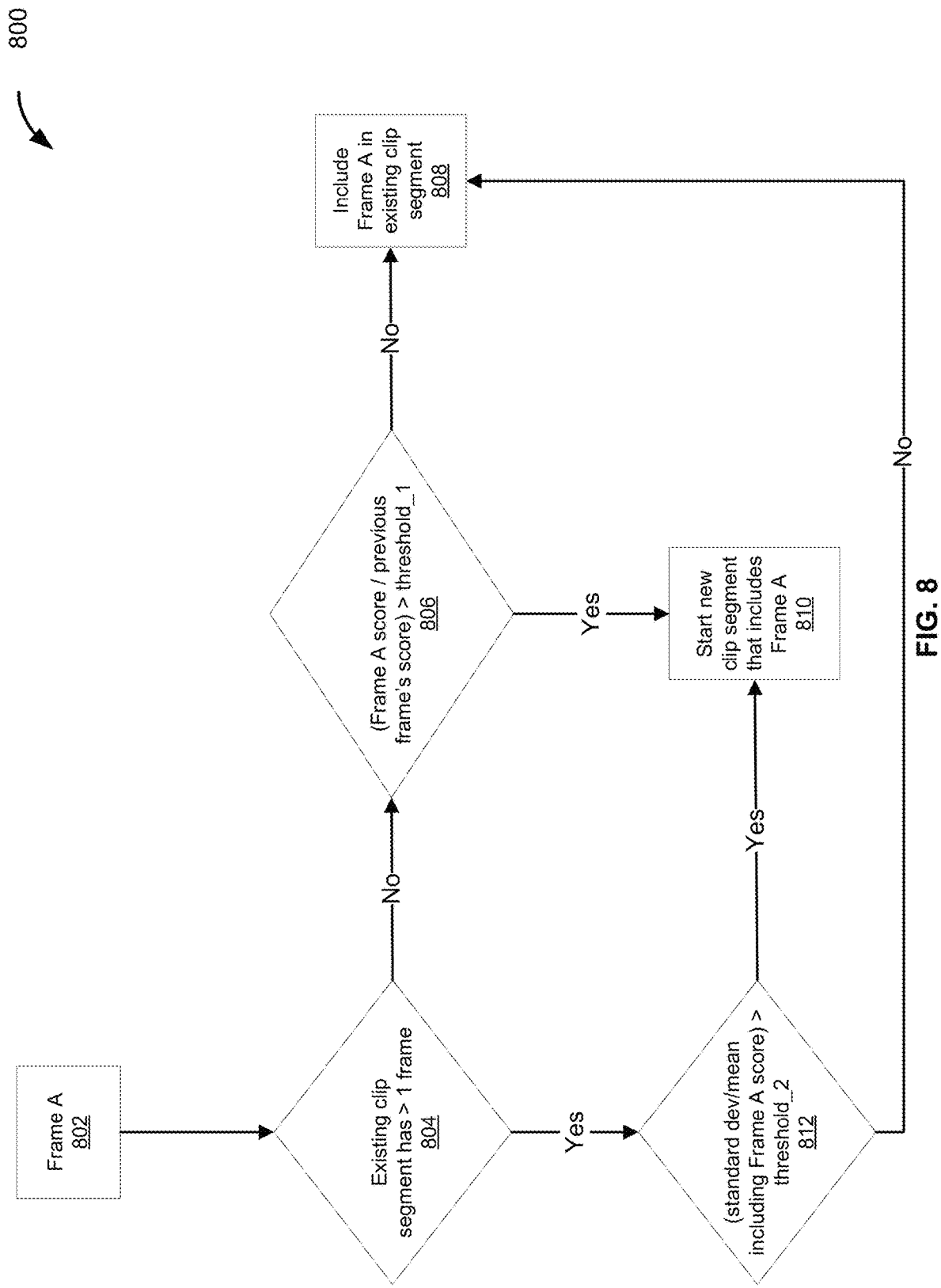
FIG. 8 is a flow diagram illustrating an example technique for generating a video clip segment, in accordance with various embodiments.

For example, suppose that video clip 306 includes ten frames. Suppose further that frames 1-3 are determined to be likely showing nudity in each frame (e.g., with probability greater than 90% for each frame), frames 4-6 are determined to not likely be showing nudity (e.g., with probability of 5% for each frame), and frames 7-10 are also determined to be likely showing nudity in each frame (e.g., with probability greater than 90% for each frame). In this example, the detection system 301 may splice (e.g., segment) the video clip 306 into three video clip segments. A first video clip segment may include frames 1-3, a second video clip segment may include frames 4-6, and a third video clip segment may include frames 7-10. In this example, the detection system 301 may determine that the first video clip segment and the third video clip segment will be presented to an end-user for further regional compliance evaluation, while the second video clip segment does not necessitate further evaluation. In this way, techniques described herein may increase the efficiency of performing compliance reviews of video content, at least in part by presenting a filtered set of content (e.g., via video segmentation) for evaluation by an agent (e.g., instead of requiring the evaluator agent to review an entire video clip or manually scan the video clip). FIG. 8 further describes an example technique for segmenting a video clip into one or more video clip segments. It should be understood that any suitable technique and/or algorithm may be utilized to segment a video clip into one or more video clip segments.

FIG. 6 is a flow diagram illustrating a technique for determining if a video content shows an uncovered portion of a body of a person, in accordance with various embodiments. In diagram 600, a flow is depicted for determining whether one or both ML models of a detection system will execute, and then, generating a frame score based on the output from the one or both ML models. The flow begins by a detection system (e.g., detection system 301 of FIG. 3) receiving a video clip and then extracting a frame (e.g., frame A 602, which may be similar to frame A 308 of FIG. 3) from the video clip. Model A 604, which may be a first ML model of the detection system that corresponds to the trained model A 401 of FIG. 4, receives frame A 602 as input, and then generates a first frame score (e.g., a probability P1, between 0 and 1). At operation 606, the detection system determines if the frame score matches (e.g., is greater than) a first threshold value ("threshold 1"). In this example, the first threshold value may be 0.1. It should be understood that the values for thresholds may be adjustable. It should also be understood that, as described herein, "matching" a threshold may correspond to any suitable comparison operator (e.g., less than, less than or equal to, greater than, greater than or equal to), depending on the context of the operation. In some embodiments, a score may match (e.g., fall within, or outside of) a range of values demarcated by two threshold values.

Continuing with the flow of FIG. 6, suppose that the first frame score does not match (e.g., is less than or equal to) the first threshold value of 0.1. In some embodiments, the detection system may output a prediction 608 that frame A 602 is negative (e.g., does not show nudity content). In this case, this output may signify that the detection system has acceptable confidence that the frame A 602 does not show nudity, and therefore, model B 610 will not be executed.

In another example, suppose that the first frame score (e.g., P1) does match the first threshold value (e.g., greater than 0.1). In this case, the detection system may determine that further analysis of frame A 602 may be warranted by model B 610, to ensure a higher level of precision. Model B 610 may correspond to a trained second ML model of the detection system, and may be similar to model B 314 of FIG. 3 and/or model B 502 of FIG. 5. Continuing with the flow, model B 610 may output a second frame score (e.g., which may also be a value between 0 and 1) for frame A 602, and then merge the second frame score with the first frame score to produce a merged score 612. The merged score 612 may be compared (e.g., matched) against a second threshold value ("threshold 2"), for example, to determine if the merged score 612 is greater than the second threshold value. If yes, the detection system may determine that frame A 602 likely shows content with nudity (e.g., a positive prediction). If not, the detection system may determine that frame A likely does not show content with nudity (e.g., a negative prediction). In some embodiments, the detection system may also (and/or alternatively) output the merged score for frame A 602, a timestamp for the frame, or other relevant data associated with the frame. In some embodiments, the detection system may further determine to include (or exclude) the frame within a video clip segment, as described herein.

In some embodiments, a threshold value may be set according to any suitable methodology. For example, in some embodiments, the first threshold value may be set such that the system maximizes coverage (e.g., recall). In some embodiments, the second threshold value may be set to maximize the precision, for example, at a particular recall percentage. In some embodiments, a range of threshold values may be used for comparison (e.g., at operation 606 and/or operation 614). For example, the detection system may determine if a particular score is greater than one threshold value and less than another threshold value. If so, the detection system may determine that the score is associated with a higher level of uncertainty, and therefore the detection system may forward the frame to the second ML model for further analysis.

Figure 7:
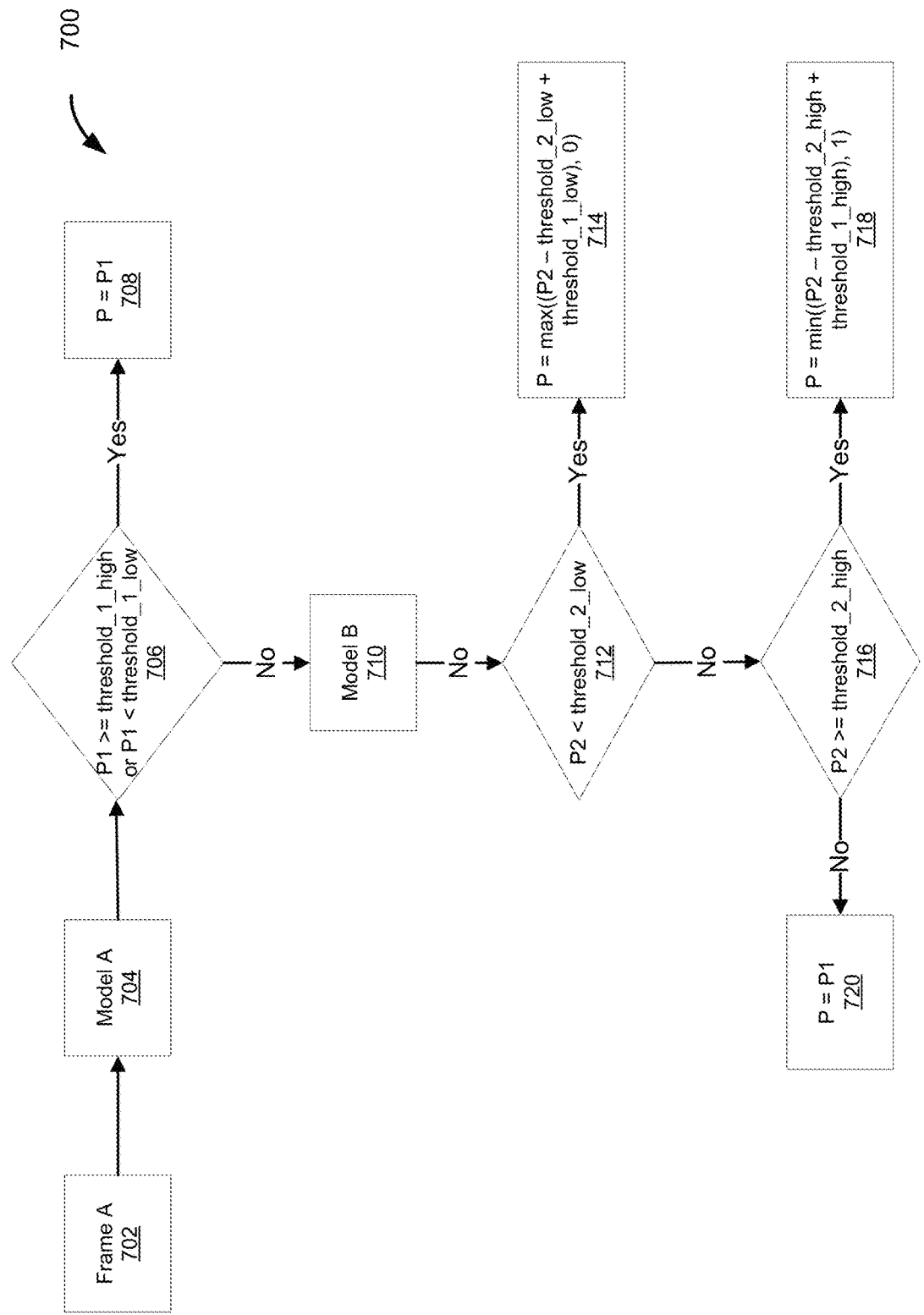
FIG. 7 is a flow diagram illustrating another technique for determining if a video content shows an uncovered portion of a body of a person, in accordance with various embodiments.

FIG. 7 is a flow diagram illustrating another technique for determining if a video content shows an uncovered portion of a body of a person, in accordance with various embodiments. In diagram 700, another flow is depicted for determining whether one or both models of a detection system will execute, and then, generating a frame score (e.g., a merged frame score) based on the output from the one or both ML models. The flow begins by a detection system (e.g., detection system 301 of FIG. 3) receiving a video clip and then extracting a frame (e.g., frame A 702, which may be similar to frame A 308 of FIG. 3) from the video clip. Model A 704, which may be a first ML model of the detection system that corresponds to the trained model A 401 of FIG. 4, receives frame A 702 as input, and then generates a first frame score (e.g., a probability P1, between 0 and 1).

At operation 706, the detection system determines if the first frame score (P1) falls within or outside of a range of values between a first threshold value ("threshold_1_high") and a second threshold value ("threshold_1_low"). For example, as depicted by diagram 700, the detection system may determine if P1 is greater than or equal to threshold_1_high ("P1>=threshold_1_high") or P1 is less than threshold_1_low ("P1<threshold_1_low") at operation 706. In some embodiments, this may indicate a level of confidence that the first frame score is accurate. For example, if P1>=threshold_1_high (e.g., 0.28, or any suitable value), then the detection system may determine (e.g., at operation 708) that the first frame score is sufficiently high to be considered the final frame score (e.g., P=P1, whereby P is the final probability score for the frame). Similarly, if P1<threshold_1_low (e.g., 0.12, or any suitable value), then P may also be set to the value of P1. In either of these cases, the second ML model may not be triggered for execution.

In an event that the first frame score (P1) falls within the range of values between threshold_1_high and threshold_1_low, the second ML model (e.g., model B 710) may be triggered for execution. Upon model B 710 generating a second frame score (P2) for frame A 702, the detection system may determine, at operation 712, if P2 is less than a third threshold value ("threshold_2_low," for example, set to 0.045). If yes, then, at operation 714, the final frame score (P) may be determined by selecting from the maximum of two values: (1) (P2−threshold_2_low+threshold_1_low), and (2) zero. If no, then, at operation 716, the detection system may determine if P2 is greater than or equal to a fourth threshold value ("threshold_2_high", for example, set to 0.92). If yes, then, at operation 718, the final frame score (P) may be determined by selecting from the minimum of two values: (1) (P1−threshold_2_high+threshold_1_high), and (2) one. If no, then, at operation 720, the final frame score (P) may be set to the value of P1, which was generated by the first ML model. In some embodiments, these calculations provide a mechanism for merging the two frame scores of both ML models, whereby P2 is adjusted to take into account the value of P1 (e.g., vis-a-vis the first or second threshold values, previously compared with P1), thus producing the final (e.g., merged) frame score (P). As described herein, it should be understood that any suitable mechanism may be utilized for determining the value of one or more threshold values.

FIG. 8 is a flow diagram illustrating an example technique for generating a video clip segment, in accordance with various embodiments. In diagram 800, a flow is depicted for determining which video clip segment a particular frame is to be included within. For example, suppose that a detection system (e.g., detection system 301 of FIG. 3) receives a video clip (e.g., video clip A 210 of FIG. 2). The detection system may extract frame A 802 from the video clip A 210, and then generate a frame score (e.g., merged frame score 318) for frame A 802, as described herein. The flow of diagram 800 may be used to determine whether frame A 802 should be included within an existing (e.g., immediately previous) video clip segment (e.g., video clip segment X 216) or should be treated as the start of a new video clip segment (e.g., video clip segment Y 218). It should be understood that, in this example, instead of (and/or in addition to) producing a single score for the video clip A 210, a video clip segment score may also be produced, respectively, for the one or more video clip segments that are generated from the video clip A 210. In some embodiments, each video clip segment score may also be generated via a max pooling process, as described herein.

Turning to the flow of diagram 800 in further detail, upon the detection system determining a final (e.g., merged) frame score for frame A 802, the detection system may determine if a previous video clip segment exists. If not, the detection system may generate a new clip segment. If a previous clip segment exists, then, at operation 804, the detection system may determine if the previous clip segment includes more than one frame. If not, then, at operation 806, the detection system may compute the frame A 802 score, divided by the previous frame's score. The detection system may then determine if the resulting value is greater than a first threshold value (e.g. "threshold 1"), which may be any suitable value. If not, then, at operation 808, the detection system may determine to include frame A 802 in the existing clip segment (e.g., the previous clip segment). If yes, then, at operation 810, the detection system may determine to start a new video clip segment that includes frame A 802.

In another example, suppose that, at operation 804, the detection system determines that the existing clip segment does have more than one frame. In this example, the detection system may, at operation 812, compute the standard deviation of the existing clip segment frame scores, divided by the mean value of the existing clip segment scores, whereby the mean value includes the frame score for frame A 802. The output of this computation may be compared against a second threshold value ("threshold 2"), which may be any suitable value. If the output is greater than the second threshold value, then, at operation 810, the detection system may determine to start a new clip segment that includes frame A 810. Otherwise, the detection system may include frame A 810 within the existing clip segment.

As described herein, by generating one or more video clip segments that, respectively, include portions (e.g., one or more frames) of a video clip, techniques may enable increased efficiency for evaluating portions of the video clip (e.g., for compliance evaluation to determine if the video clip contains content with nudity). It should be understood that any suitable number of video clip segments may be generated via these techniques. Also, a video clip segment may be associated with a thumbnail image (e.g., a frame with the highest score in the video clip segment), start and/or stop times, or any other suitable data that may be used for presenting and/or indexing the video clip segment.

FIG. 9 is a flow diagram illustrating a method for presenting a video clip segment based on determining a likelihood that the video clip segment shows an uncovered portion of a body of a person, in accordance with various embodiments. Process 900 may be performed by any of the detection systems described herein.

Some or all of the process 900 and/or 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 902, a detection system receives video content including a first frame. The first frame shows an uncovered portion of a body of a person, whereby the portion is one of a plurality of body part types. For example, the body part types may be those that are subject to a compliance evaluation (e.g., a nudity content evaluation), such as bare buttocks, bare female breasts, bare male genitalia, and/or bare female genitalia. The video content (e.g., a video clip) may include a sequence of frames that includes the first frame.

At block 904, a machine learning model (ML model) of the detection system receives the first frame of video content. The ML model may be trained based at least in part on a loss function that penalizes the ML model for incorrectly identifying that a region of a map (e.g., a class activation map) associated with the first frame is associated with one of the plurality of uncovered body part types. In some embodiments, this ML model may be a first machine learning model that is similar to model A 401 of FIG. 4 (e.g., utilizing a weakly supervised segmentation model). In some embodiments, the loss function may one of a plurality of loss functions that are used to train the first ML model. In some embodiments, the loss function may be used to perform L2 regularization of the model (e.g., utilization a class activation map).

At block 906, the machine learning model determines a score (e.g., between 0 and 1) indicating a likelihood that the first frame shows at least one of the plurality of uncovered body part types. In some embodiments, this score may be a final score for the first frame. In some embodiments, as described further herein with respect to FIG. 10, the detection system may further execute a second machine learning model to analyze the first frame, for example, depending on the value of the score produced by the first ML model.

At block 908, the detection system determines that a portion of the video content that includes the first frame will be presented on a display based on the score. For example, the portion may correspond to one or more frames of a video clip segment that is generated from the video content (e.g., the video clip). In some embodiments, the portion may be presented on the display for performing a compliance evaluation of the video clip, for example, as described in reference to FIG. 1.

Figure 10:
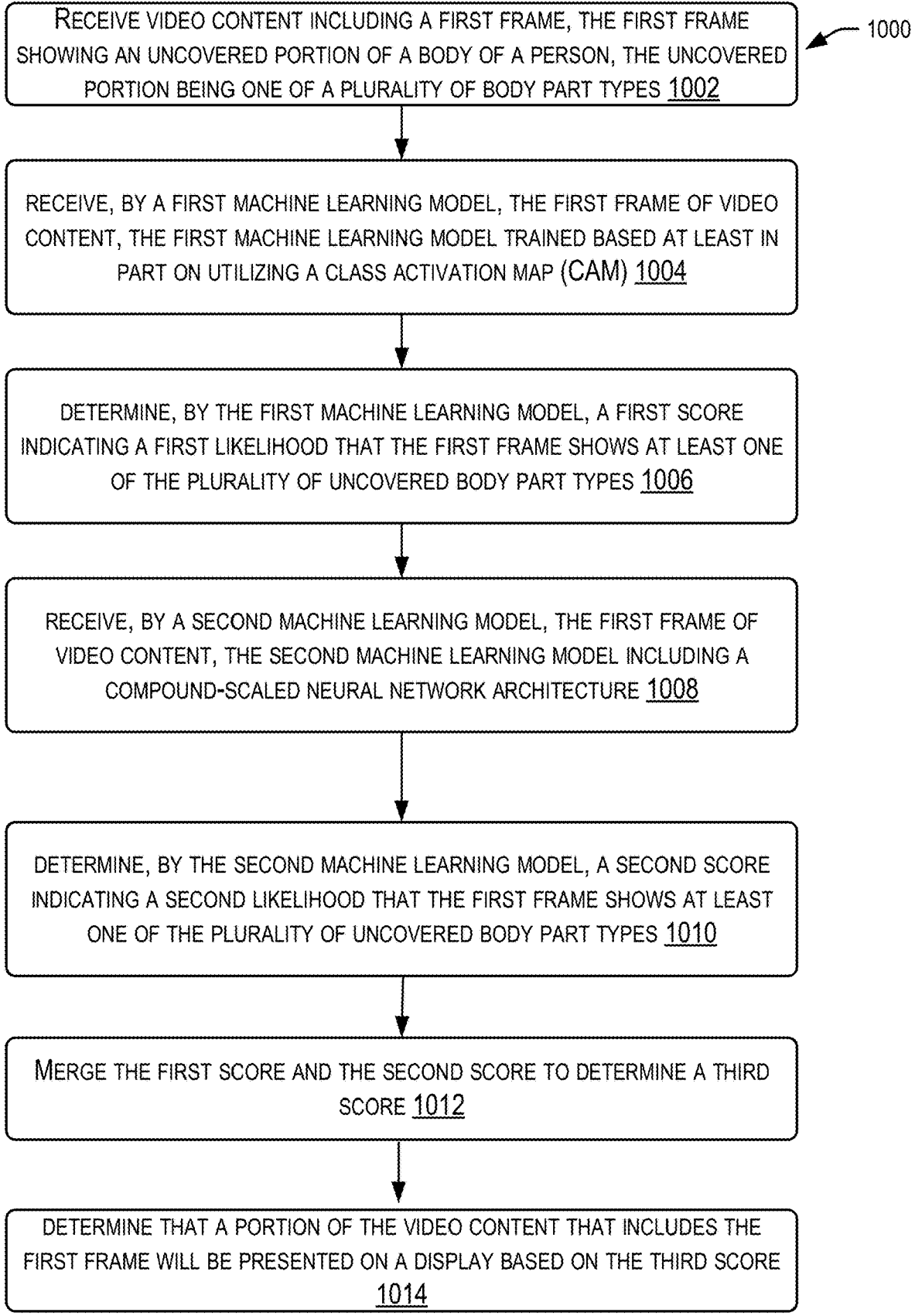
FIG. 10 is a flow diagram illustrating another method for presenting a video clip segment based on determining a likelihood that the video clip segment shows an uncovered portion of a body of a person, in accordance with various embodiments.

FIG. 10 is a flow diagram illustrating another method for presenting a video clip segment based on determining a likelihood that the video clip segment shows an uncovered portion of a body of a person, in accordance with various embodiments. In FIG. 10, the method includes a detection system utilizing both a first ML model and a second ML model to generate a merged score for a frame.

At block 1002, the detection system receives video content including a first frame. The first frame shows an uncovered portion of a body of a person, the uncovered portion being one of a plurality of body part types. In some embodiments, one or more operations of block 1002 may be similar to those of block 902 of FIG. 9.

At block 1004, a first machine learning model of the detection system receives the first frame of video content. Similar to block 904 of FIG. 9, the first ML model may be trained based in part on utilizing one or more class activation maps (CAMs).

At block 1006, the first machine learning model may determine a first score indicating a likelihood that the first frame shows at least one of the plurality of uncovered body part types. In some embodiments, one or more operations of block 1006 may be similar to those of block 906 of FIG. 9. In some embodiments, the first ML model is trained to be optimized for high recall (e.g., a target recall rate).

At block 1008 a second machine learning model of the detection system may receive the first frame of video content. The second ML model may include a neural network architecture. The neural network architecture may have been compound-scaled, as described in reference to FIG. 5. In some embodiments, the second machine learning model is compounded scaled from a baseline neural network model according a plurality of dimensions that includes: (I) a resolution of the first frame, (II) a depth of the baseline neural network model, and (III) a width of the baseline neural network model. In this way, the second ML model may achieve an acceptable level of precision (e.g., a target precision rate), for example, higher precision than the first ML model. In some embodiments, the second ML model may be optimized for precision, while the first ML model may be optimized for recall. In some embodiments, the second ML model may be triggered to be executed based in part on one or more conditions being satisfied (e.g., comparison of the first score with one or more predefined threshold values), as described in reference to FIGS. 6 and/or 7. In some embodiments, the first ML model and the second ML model may run in parallel, independent of the first score output by the first ML model.

At block 1010, the second machine learning model determines a second score indicating a second likelihood that the first frame shows at least one of the plurality of uncovered body part types. In some embodiments, one or more operations of block 1010 may be similar to as described in reference to FIGS. 3 and/or 5.

At block 1012, the detection system merges the first score and the second score to determine a third score (e.g., a final frame score). In some embodiments, one or more operations of block 1012 may be similar to as described in reference to FIGS. 6 and/or 7. In some embodiments, the first score, the second score, and/or the third score may be determined based on performing average pooling of one or more CAMs. This may include, for example, determining an average value of pixels for a given CAM, and/or computing the average value across CAMs produced for a given image.

At block 1014, the detection system determines that a portion of the video content that includes the first frame will be presented on a display, based on the third score. In some embodiments, one or more operations of block 1014 may be similar to as described in reference to block 908. In some embodiments, the portion may correspond to a video clip segment including one or more frames that are a subset of the sequence of frames of the video content (e.g., see FIG. 2), whereby a plurality of video clip segments may be generated from the video content. In some embodiments, the plurality of video clip segments may be generated similar to as described in reference to FIG. 8. In some embodiments, a score for the portion may be determined from a plurality of scores that are generated for respective frames of the portion. The detection system may select a frame based in part on determining that the selected frame is associated with a maximum score of the plurality of scores of the frames of the video clip segment (or, as the case may be, the video clip). In some embodiments, the selected frame may be presented as a thumbnail image for presentation on the display, as described in reference to GUI 108 of FIG. 1.

Figure 11:
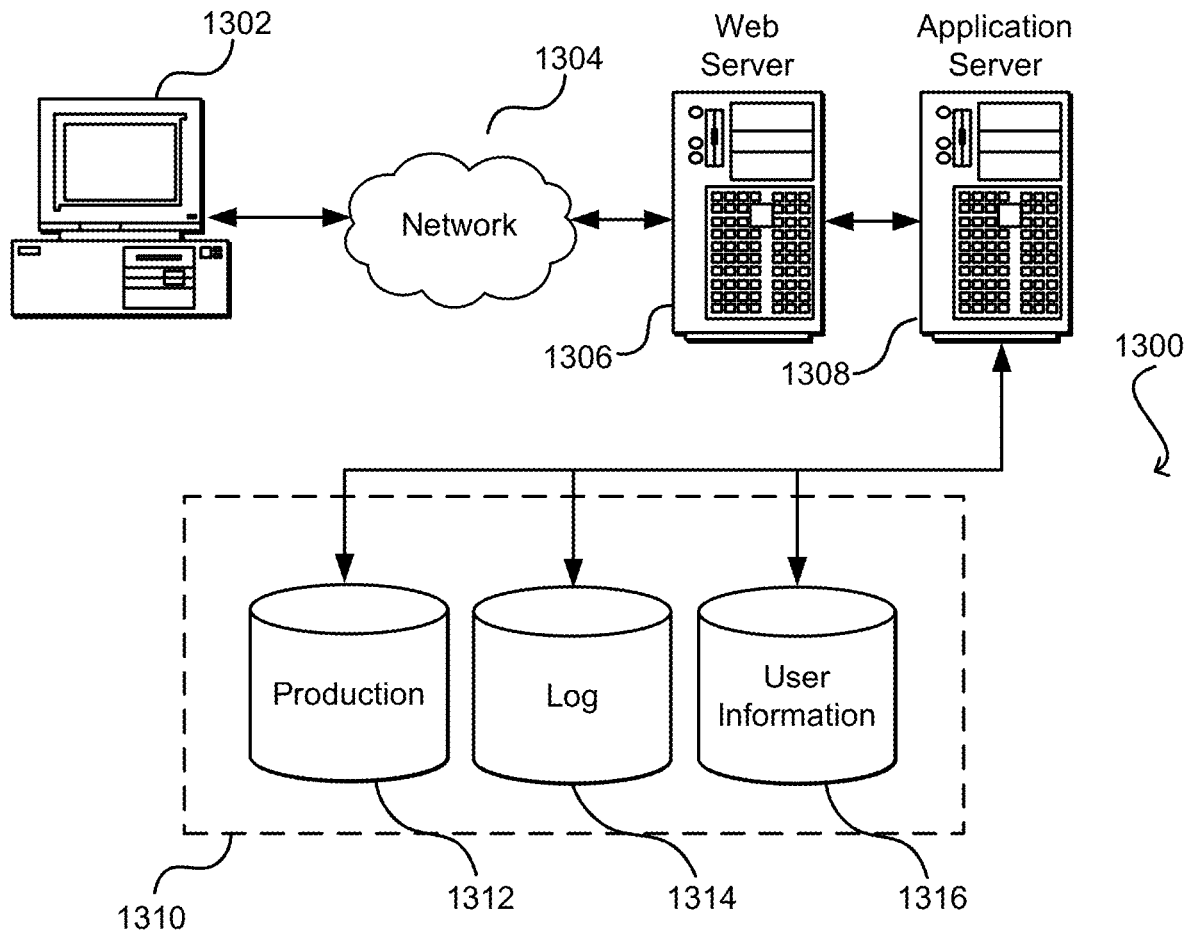
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, by a computer system, video content including a sequence of frames that includes a first frame, the first frame showing an uncovered portion of a body of a person, the uncovered portion being one of a plurality of uncovered body part types that are subject to a compliance evaluation, the uncovered portion comprising an external, uncovered portion of the body of the person;
    determining, by the computer system, a plurality of scores, respectively, for frames of the video content;
    selecting, by the computer system, the first frame based at least in part on determining that the first frame is associated with a maximum score of the plurality of scores of the frames of the video content;
    receiving, by a first machine learning model of the computer system, the first frame of the video content, the first machine learning model trained based at least in part on utilizing a map that indicates a region within the first frame associated with one of the plurality of uncovered body part types;
    determining, by the first machine learning model, a first score indicating a first likelihood that the first frame shows at least one of the plurality of uncovered body part types;
    receiving, by a second machine learning model of the computer system, the first frame of the video content, the second machine learning model including a neural network architecture;
    determining, by the second machine learning model, a second score indicating a second likelihood that the first frame shows at least one of the plurality of uncovered body part types;
    merging, by the computer system, the first score and the second score to determine a third score, which is the maximum score; and
    determining, by the computer system and based at least in part on the maximum score, that a portion of the video content that includes the first frame will be presented on a display for performing the compliance evaluation based at least in part on the third score.

2. The computer-implemented method of claim 1, wherein the second machine learning model receives the first frame of the video content upon the computer system determining that the first score is greater than a predefined threshold value.

3. The computer-implemented method of claim 1, wherein the first machine learning model includes a weakly supervised segmentation (WSS) model, and wherein the map corresponds to a class activation map (CAM), the first machine learning model trained based at least in part on a loss function that penalizes the first machine learning model for incorrectly identifying that a region of the class activation map associated with the first frame is associated with one of the plurality of uncovered body part types.

4. The computer-implemented method of claim 1, wherein the plurality of uncovered body part types includes at least one of a buttock, a breast, or a genitalia.

5. A computer device, comprising:
   a memory comprising computer-executable instructions; and
   one or more processors in communication with the memory and configured to access the memory and execute the computer-executable instructions to perform operations comprising:
      receiving video content including a first frame, the first frame showing an uncovered portion of a body of a person, the uncovered portion being one of a plurality of uncovered body part types, the uncovered portion comprising an external, uncovered portion of the body of the person;
      determining a plurality of scores, respectively, for frames of the video content;
      selecting the first frame based at least in part on determining that the first frame is associated with a maximum score of the plurality of scores of the frames of the video content;
      receiving, by a machine learning model of the computer device, the first frame of the video content, the machine learning model trained based at least in part on a loss function that penalizes the machine learning model for incorrectly identifying that a region of a map associated with a frame is associated with one of the plurality of uncovered body part types;
      determining, by the machine learning model, a score indicating a likelihood that the first frame shows at least one of the plurality of uncovered body part types, wherein the score is the maximum score; and
      determining, based at least in part on the maximum score, whether a portion of the video content that includes the first frame will be presented on a display based at least in part on the score.

6. The computer device of claim 5, wherein the memory comprises further computer-executable instructions that, when executed by the one or more processors, further causes the computing device to perform operations comprising:
   receiving, by a second machine learning model of the computer device, the first frame of the video content, the second machine learning model including a neural network architecture;
   determining, by the second machine learning model, a second score indicating a second likelihood that the first frame shows at least one of the plurality of uncovered body part types;
   merging the score and the second score to determine a third score; and
   determining whether the portion of the video content that includes the first frame will be presented on the display based at least in part on the third score.

7. The computer device of claim 6, wherein the neural network architecture of the second machine learning model is compounded scaled from a baseline neural network model according to a plurality of dimensions that includes: (I) a resolution of the first frame, (II) a depth of the baseline neural network model, and (III) a width of the baseline neural network model.

8. The computer device of claim 6, wherein the machine learning model is associated with a target recall rate, and wherein the second machine learning model is associated with a target precision rate.

9. The computer device of claim 6, wherein the second machine learning model receives the first frame of the video content upon a determination that the score is greater than a predefined threshold value.

10. The computer device of claim 6, wherein the second machine learning model receives the first frame of the video content upon a determination that the score is greater than or equal to a first predefined threshold value and less than a second predefined threshold value.

11. The computer device of claim 5, wherein the machine learning model includes a weakly supervised segmentation (WSS) model, and wherein the map corresponds to a class activation map (CAM).

12. The computer device of claim 11, wherein determining the score further comprises performing average pooling of the class activation map.

13. The computer device of claim 5, wherein the video content corresponds to a video clip that includes a sequence of frames that includes the first frame, and wherein the portion of the video content corresponds to a video clip segment that includes a subset of the sequence of frames, the subset determined based at least in part on comparing the score with one or more scores of the sequence of frames.

14. The computer device of claim 5, wherein the selected frame is presented as a thumbnail image for presentation on the display.

15. One or more non-transitory computer-readable storage media comprising computer-executable instructions that, when executed by one or more processors, cause the one or more processors to perform operations comprising:
   receiving video content including a first frame, the first frame showing an uncovered portion of a body of a person, the uncovered portion being one of a plurality of uncovered body part types, the uncovered portion comprising an external, uncovered portion of the body of the person;
   determining a plurality of scores, respectively, for frames of the video content;
   selecting the first frame based at least in part on determining that the first frame is associated with a maximum score of the plurality of scores of the frames of the video content;
   receiving, by a machine learning model, the first frame of the video content, the machine learning model trained based at least in part on a loss function that penalizes the machine learning model for incorrectly identifying that a region of a map associated with a frame is associated with one of the plurality of uncovered body part types;
   determining, by the machine learning model, a score indicating a likelihood that the first frame shows at least one of the plurality of uncovered body part types, wherein the score is the maximum score; and
   determining, based at least in part on the maximum score, whether a portion of the video content that includes the first frame will be presented on a display based at least in part on the score.

16. The one or more non-transitory computer-readable storage media of claim 15, wherein the instructions further comprise:

receiving, by a second machine learning model, the first frame of the video content, the second machine learning model including a neural network architecture;

determining, by the second machine learning model, a second score indicating a second likelihood that the first frame shows at least one of the plurality of uncovered body part types;

merging the score and the second score to determine a third score; and determining whether the portion of the video content that includes the first frame will be presented on the display based at least in part on the third score.

17. The one or more non-transitory computer-readable storage media of claim 16, wherein the second machine learning model is trained based at least in part on at least one of: (I) one or more images that are respectively scored by the machine learning model to be greater than a predefined threshold value, or (II) one or more images respectively associated with a type of error pattern of the machine learning model.

18. The one or more non-transitory computer-readable storage media of claim 15, wherein the score is less than a predefined threshold value, and wherein the instructions further comprise determining to not present the portion of the video content that includes the first frame on the display.

19. The one or more non-transitory computer-readable storage media of claim 15, wherein the instructions further comprise:

generating a plurality of video clip segments from the video content, the portion of the video content corresponding to one of the plurality of video clip segments, and the portion being selected for presentation on the display based at least in part on determining that the score is greater than a predefined threshold value.

* * * * *